(12) United States Patent
Ding et al.

(10) Patent No.: US 10,394,655 B2
(45) Date of Patent: Aug. 27, 2019

(54) METHOD FOR DETECTING ABNORMAL APPLICATION AND MOBILE TERMINAL

(71) Applicant: BEIJING KINGSOFT INTERNET SECURITY SOFTWARE CO., LTD., Beijing (CN)

(72) Inventors: Shanglun Ding, Beijing (CN); Kangzong Zhang, Beijing (CN); Chao Xiao, Beijing (CN); Yaxiong Zhang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 128 days.

(21) Appl. No.: 15/327,686

(22) PCT Filed: Sep. 2, 2015

(86) PCT No.: PCT/CN2015/088885
§ 371 (c)(1),
(2) Date: Jan. 20, 2017

(87) PCT Pub. No.: WO2016/054957
PCT Pub. Date: Apr. 14, 2016

(65) Prior Publication Data
US 2017/0212807 A1 Jul. 27, 2017

(30) Foreign Application Priority Data
Oct. 10, 2014 (CN) .......................... 2014 1 0532339

(51) Int. Cl.
*G06F 11/00* (2006.01)
*G06F 11/14* (2006.01)
(Continued)

(52) U.S. Cl.
CPC .......... *G06F 11/1438* (2013.01); *G06F 11/00* (2013.01); *G06F 11/0742* (2013.01);
(Continued)

(58) Field of Classification Search
CPC ............. G06F 11/0706; G06F 11/0718; G06F 11/3612; G06F 11/3636; G06F 11/3668; G06F 11/3672; G06F 11/3688
(Continued)

(56) References Cited

U.S. PATENT DOCUMENTS

| 8,959,530 B1* | 2/2015 | Leonard | ............... G06F 9/546 718/102 |
| 2009/0241110 A1* | 9/2009 | Heo | .................. G06F 9/45537 718/1 |

(Continued)

FOREIGN PATENT DOCUMENTS

| CN | 101674465 A | 3/2010 |
| CN | 102932387 | 2/2013 |

(Continued)

OTHER PUBLICATIONS

ISA/CN, International Search Report for PCT/CN2015/088885, dated Dec. 3, 2015.

*Primary Examiner* — Sarai E Butler
(74) *Attorney, Agent, or Firm* — Hodgson Russ LLP

(57) ABSTRACT

A method for detecting an abnormal application and a terminal are provided. The method includes: detecting a system event of a mobile terminal; reading process information if the system event is a triggering system event; determining whether a restarting process exists according to the process information; recording the number of restarting of the restarting process in a preset period; and determining that an application corresponding to the restarting process is abnormal, if the number of restarting is greater than a preset
(Continued)

threshold. The method has a wide application scope for process detection, and may reduce energy consumption and resource occupancy while improving efficiency of abnormal application detection.

17 Claims, 3 Drawing Sheets

(51) Int. Cl.
    *G06F 11/36* (2006.01)
    *G06F 11/07* (2006.01)

(52) U.S. Cl.
    CPC ...... *G06F 11/0754* (2013.01); *G06F 11/3612* (2013.01); *Y02D 10/34* (2018.01)

(58) Field of Classification Search
    USPC .......................................................... 714/38.1
    See application file for complete search history.

(56) References Cited

U.S. PATENT DOCUMENTS

| | | | | |
|---|---|---|---|---|
| 2010/0185894 | A1* | 7/2010 | Herta | G06F 11/1461 714/4.1 |
| 2014/0259155 | A1* | 9/2014 | Kim | G06F 21/44 726/19 |
| 2015/0312248 | A1* | 10/2015 | Pruthi | H04L 63/0838 726/7 |
| 2016/0105454 | A1* | 4/2016 | Li | G06F 17/30958 726/23 |
| 2017/0116014 | A1* | 4/2017 | Yang | G06F 9/45558 |

FOREIGN PATENT DOCUMENTS

| | | |
|---|---|---|
| CN | 103309668 A | 9/2013 |
| JP | 2013140491 A | 7/2013 |

\* cited by examiner

METHOD FOR DETECTING ABNORMAL APPLICATION AND MOBILE TERMINAL

CROSS-REFERENCE TO RELATED APPLICATIONS

This application is a U.S. national phase application based up an International Application No. PCT/CN2015/088885, which claims a priority to Chinese Patent Application Serial No. 201410532339.6, filed on Oct. 10, 2014, by Beijing Kingsoft Internet Security Software Co., Ltd., titled "method and device for detecting an abnormal application and mobile terminal", the entire content of which is incorporated herein by reference.

FIELD

The present disclosure relates to field of mobile terminal technology, and more particularly to a method and a device for detecting an abnormal application and a mobile terminal.

BACKGROUND

With the continuous development of mobile terminal technology, the mobile terminal has more and more powerful functions, and an increasing number of applications have installed thereon. Some applications installed on the mobile terminal may result in excessive resource occupancy owing to abnormal operation or other factors, such that the mobile terminal may stutter, lag, generate heat and the like, and may consume a lot of power as well. The application installed on the mobile terminal may restart frequently owing to abnormal operation, which is one of circumstances of resulting in excessive resource occupancy.

At present, the mobile terminal may detect a process newly starting in the mobile terminal via a periodic enumeration way so as to detect an application frequently restarting in the mobile terminal. Taking the mobile terminal with Android system for example, the process starting in the mobile terminal may be acquired via the periodic enumeration of Android process API, such as getRunningAppProcesses( ) and the process frequently restarting may be determined according to an enumeration result.

However, there are problems in the periodic enumeration way as follows.

1. A slow speed and a burden increased on the mobile terminal system owing to environment, attribute and a current load of the mobile terminal.

2. A certain amount of power consumption every time when performing an enumeration, such that the method of performing the periodic enumeration consumes huge power of the mobile terminal.

3. Not supporting a restart detection of a native process.

SUMMARY

Embodiments of a first aspect of the present disclosure provide a method for detecting an abnormal application. The method includes: detecting a system event of a mobile terminal; reading process information if the system event is a triggering system event and determining whether a restarting process exists according to the process information; recording the number of restarting of the restarting process in a preset period; and determining that an application corresponding to the restarting process is abnormal if the number of restarting is greater than a preset threshold.

Embodiments of a second aspect of the present disclosure provide a mobile terminal. The mobile terminal includes: a housing, a processor, a memory, a circuit board and a power circuit. The circuit board is arranged inside a space enclosed by the housing; the processor and the memory are disposed on the circuit board; the power circuit is configured to provide power for individual circuit or component of the mobile terminal; the memory is configured to store an executable program code; and the processor is configured to run a program corresponding to the executable program code by reading the executable program code stored in the memory, so as to perform the followings: detecting a system event of a mobile terminal; reading process information if the system event is a triggering system event, and determining whether a restarting process exists according to the process information; recording the number of restarting of the restarting process in a preset period; and determining that an application corresponding to the restarting process is abnormal, if the number of restarting is greater than a preset threshold. Embodiments of a third aspect of the present disclosure provide a non-transitory computer storage medium. The storage medium is configured to store an application for performing the method for detecting an abnormal application, in which the method includes: detecting a system event of a mobile terminal; reading process information if the system event is a triggering system event; determining whether a restarting process exists according to the process information; recording the number of restarting of the restarting process in a preset period; and determining that an application corresponding to the restarting process is abnormal, if the number of restarting is greater than a preset threshold.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
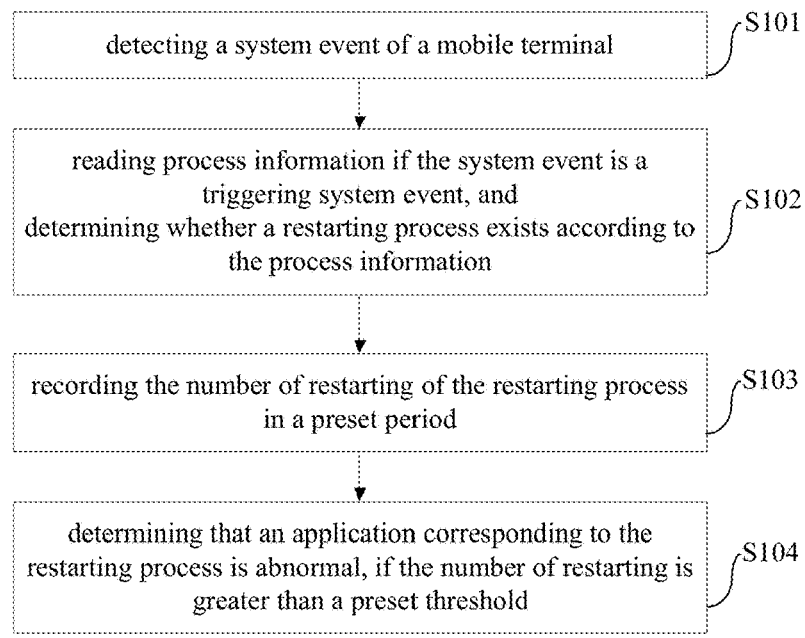
FIG. 1 is a flow chart of a method for detecting an abnormal application according to an embodiment of the present disclosure.

Descriptions of embodiments of the present disclosure will be made in detail, and examples of embodiments will be shown in accompanying drawings, in which the same or similar elements and the elements having same or similar functions are denoted by like reference numerals throughout the descriptions. The embodiments described herein with reference to accompanying drawings are exemplary and are intended to illustrate the present disclosure, which is not construed to limit the present disclosure. Instead, the embodiments of the present disclosure comprise all the variants, modifications and their equivalents within the spirit and scope of the present disclosure as defined by the claims.

In the description of the present disclosure, it is to be understood that, terms such as "first" and "second" are used herein for purposes of description and are not intended to indicate or imply relative importance. In the description of the present disclosure, it is to be illustrated that, unless specified or limited otherwise, terms "interconnected," and "connected," are understood broadly, such as fixed, detached or integral interconnections and connections, also can be mechanical or electrical interconnections and connections, further can be direct interconnections and connections and indirect interconnections and connections via intermediate medium. For those skilled in the art, it can be understood the concrete meaning of the terms mentioned above in the present disclosure according to specific circumstances. Furthermore, in the description of the present disclosure, unless illustrated otherwise, "a plurality of" means two or more than two.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art related to the present disclosure.

A method and a device for detecting an abnormal application and a mobile terminal according to embodiments of the present disclosure will be described with reference to accompanying drawings as follows.

It is to be understood that, in embodiments of the present disclosure, the mobile terminal may be a mobile phone, a laptop computer, a tablet computer, an E-book, a personal digital assistant (PDA) and other device with an operating system.

FIG. 1 is a flow chart of a method for detecting an abnormal application according to an embodiment of the present disclosure. As shown in FIG. 1, the method includes followings.

At S101, a system event of the mobile phone may be detected.

In embodiments of the present disclosure, any system event in the mobile terminal may be detected, and it is further determined whether the system event detected is a triggering system event.

In an embodiment of the present disclosure, the triggering system event may be determined if the system event is one of: a broadcasting system event (e.g. a screen on broadcast, a screen off broadcast and other broadcast events), a memory shortage alarming system event, an application restarting system event, an application abnormally exiting system event and the like.

At S102, process information may be further read if the system event is the triggering system event, and it is determined whether a restarting process exists according to the process information.

In an embodiment of the present disclosure, process information recorded by the kernel/proc file system in the mobile terminal is read so as to read the process information. The kernel/proc file system is a special file system created by software, by which the kernel may export information to external. All information about the processes running currently may be recorded in the kernel/proc file system. Therefore, the process information may be read by reading the process information recorded by the kernel/proc file system in the mobile terminal.

Additionally, compared with the conventional method of reading a process via an API getRunningAppProcesses( ), the method of directly reading the process information from the kernel/proc file system may save time of reading the process information and acquire complete and comprehensive data of the process without function calculations in the API getRunningAppProcesses( ). In an implementation process of the present disclosure, an inventor found that the time period of directly reading the process information from the kernel/proc file system is about 40 percent of the time period of reading the process information via the API getRunningAppProcesses( ). Therefore, the method according to embodiments of the present disclosure may significantly save the time of reading the process information, thereby improving efficiency of detecting the abnormal application.

Specifically, in an embodiment of the present disclosure, the process information may include a process name and a process identifier (PID) corresponding to the process name. It may be determined whether a PID corresponding to a same process name is as same as a PID in the process information read last time according to the process information recorded by the kernel/proc file system in the mobile terminal or not; if not, the restarting process may be determined.

At S103, the number of restarting of the restarting process in a preset period may be recorded.

In an embodiment of the present disclosure, the process information may be read by a preset frequency in the preset period, and then the number of restarting may be recorded according to a change condition of the process information. Taking an example to illustrate, a plurality of processes and PIDs thereof may be acquired according to the process information every time when the process information is read. It may be determined that the process restarts if the PID of a process is different from that in the process information read last time, then the number of restarting of the process may be added 1. Therefore, the number of restarting of each process may be acquired after the process information is read continuously by the preset frequency in the preset period. The preset period and the preset frequency may be set as default.

At S104, it is determined that an application corresponding to the restarting process is abnormal if the number of restarting is greater than a preset threshold.

The method for detecting an abnormal application according to embodiments of the present disclosure, by detecting the system event of the mobile terminal, reading the process information if the triggering system event is detected, recording the number of restarting of the restarting process in the preset period if the restarting process exists, and determining that the application corresponding to the process of which the number of restarting is greater than the preset threshold is abnormal, may read the process information only if the triggering system event is detected, and may be less influenced by environment, attribute and a load of the mobile terminal, thereby reducing energy consumption and resource occupancy while improving efficiency of the abnormal application detection. Furthermore, the method may support a native process, thereby having a wider application scope for detection.

Figure 2:
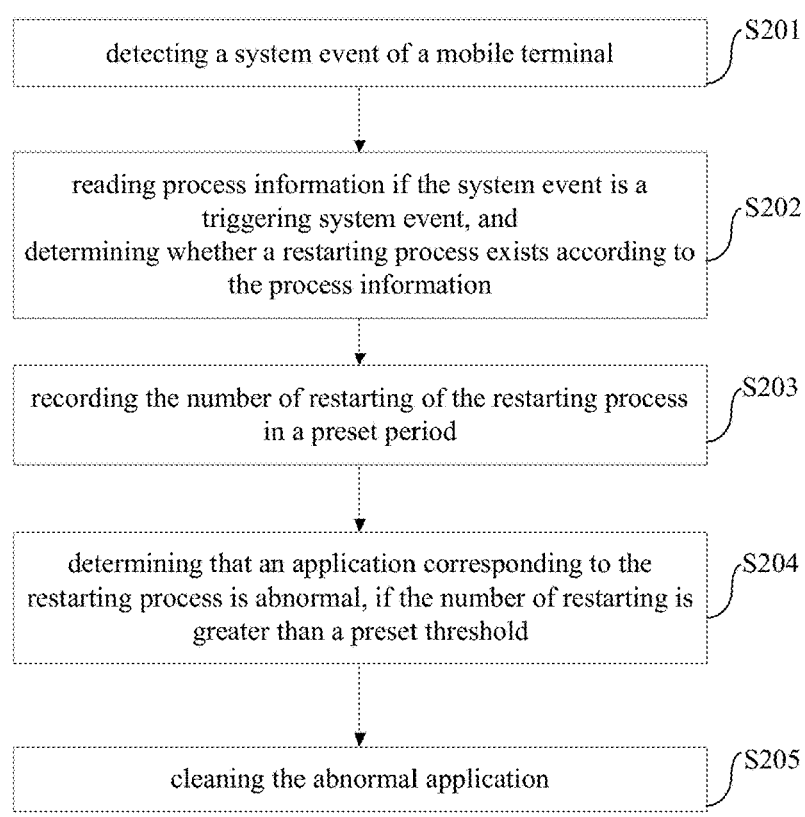
FIG. 2 is a flow chart of a method for detecting an abnormal application according to another embodiment of the present disclosure.

FIG. 2 is a flow chart of a method for detecting an abnormal application according to another embodiment of the present disclosure. As shown in FIG. 2, the method includes followings.

S201-S204 are as same as S101-S104 in the embodiment shown in FIG. 1, which may be understood with reference to the embodiment shown in FIG. 1 and may be not described herein.

At S205, the abnormal application may be cleaned.

In embodiments of the present disclosure, a manner for cleaning the abnormal application may include forcedly stopping running, disabling automatic restart, removing, upgrading and the like.

In an embodiment of the present disclosure, the abnormal application may be provided to a user of the mobile terminal, and may be cleaned according to an instruction of the user. Specifically, a button for cleaning the abnormal application may be provided to the user such that the user may touch the button to input the instruction for preforming a clean.

In another embodiment of the present disclosure, after determining that the application corresponding to the restarting process is abnormal, the method further includes: acquiring the number of restarting of the abnormal application, and providing the number of restarting of the abnormal application to the user of the mobile terminal. The number of restarting of the application is the number of restarting of the process corresponding to the application.

Figure 3:
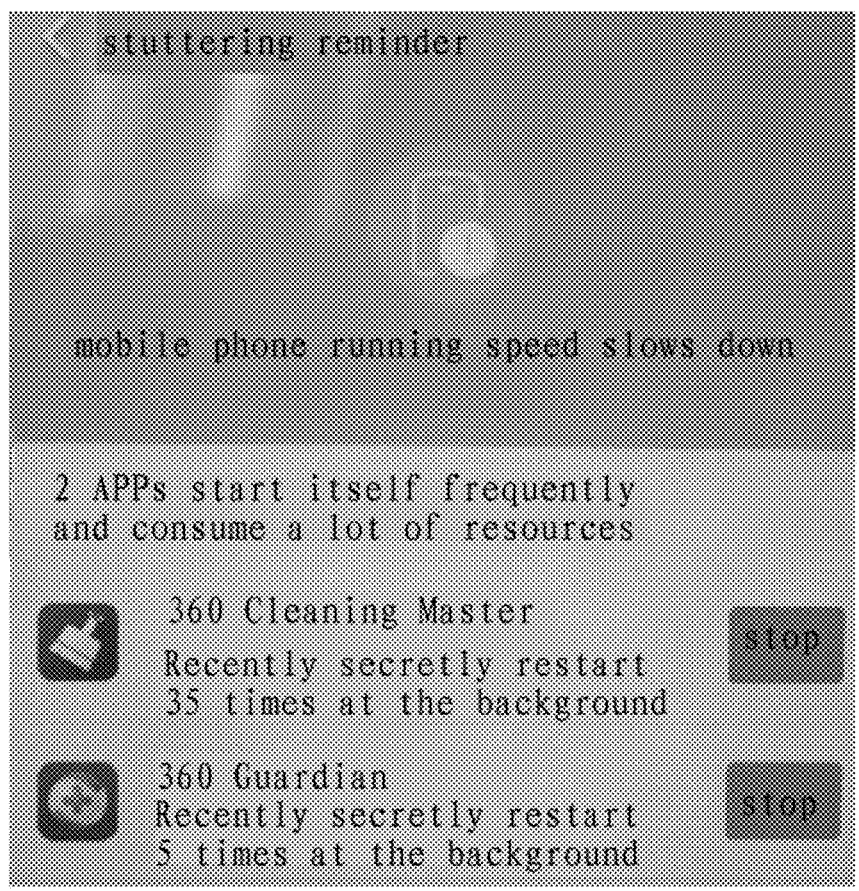
FIG. 3 is a schematic diagram showing a detection result interface of an abnormal application according to an embodiment of the present disclosure.

Taking an example to illustrate, FIG. 3 is a schematic diagram showing a detection result interface of an abnormal application according to an embodiment of the present disclosure. As shown in FIG. 3, two applications (360 Cleaning Master and 360 Guardian) are detected to be abnormal and the numbers of restarting thereof are shown. Furthermore, for each application, a button with "stop" is provided. The corresponding application may be stopped to finish the behavior that the abnormal application restarts frequently, if the user touches the button.

The method for detecting an abnormal application according to embodiments of the present disclosure, may clean the abnormal application after the abnormal application is determined, in addition, may provide the number of restarting of the abnormal application to the user, and may facilitate the user to understand a running condition of the abnormal application, so as to help the user to adopt an appropriate solution, thereby reducing energy consumption and resource occupancy while improving efficiency of the abnormal application detection, and improving the user experience.

In order to achieve the above embodiments, embodiments of the present disclosure provide a device for detecting an abnormal application.

Figure 4:
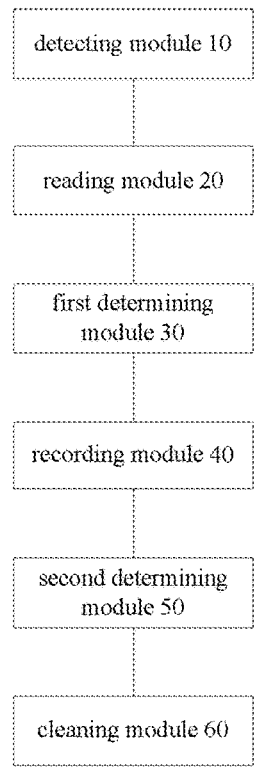
FIG. 4 is a schematic diagram showing a device for detecting an abnormal application according to an embodiment of the present disclosure.

FIG. 4 is a schematic diagram showing a device for detecting an abnormal application according to an embodiment of the present disclosure. As shown in FIG. 4, the device includes: a detecting module 10, a reading module 20, a first determining module 30, a recording module 40 and a second determining module 50.

Specifically, the detecting module 10 is configured to detect a system event of a mobile terminal.

In embodiments of the present disclosure, the detecting module 10 may detect any system event in the mobile terminal, and may further determine whether the system event detected is a triggering system event.

In an embodiment of the present disclosure, the triggering system event may be determined if the system event is one of: a broadcasting system event (e.g. a screen on broadcast, a screen off broadcast and other broadcast events), a memory shortage alarming system event, an application restarting system event, an application abnormally exiting system event and the like.

The reading module 20 is configured to further read process information if the system event is the triggering system event.

In an embodiment of the present disclosure, the reading module 20 may read the process information by reading process information recorded by the kernel/proc file system in the mobile terminal. The kernel/proc file system is a special file system created by software, by which the kernel may export information to external. All information about the processes running currently may be recorded in the kernel/proc file system. Therefore, the process information may be read by reading the process information recorded by the kernel/proc file system in the mobile terminal.

Additionally, compared with the conventional method for reading a process via an API getRunningAppProcesses( ), the method of directly reading the process information from the kernel/proc file system may save time of reading the process information and acquire complete and comprehensive data of the process without function calculations of the API getRunningAppProcesses( ). In an implementation process of the present disclosure, an inventor found that the time period of directly reading the process information from the kernel/proc file system is about 40 percent of the time period of reading the process information via the API getRunningAppProcesses( ). Therefore, the method according to embodiments of the present disclosure may significantly save the time of reading the process information, thereby improving efficiency of detecting the application exception.

The first determining module 30 is configured to determine whether a restarting process exists according to the process information.

More specifically, in an embodiment of the present disclosure, the process information may include a process name and a process identifier (PID) corresponding to the process name. The first determining module 30 may determine whether a PID corresponding to a same process name is as same as a PID in the process information read last time or not; if not, the determining module 30 may determine the restarting process.

The recording module 40 is configured to record the number of restarting of the restarting process in a preset period.

In an embodiment of the present disclosure, the recording module 40 may read the process information by a preset frequency in the preset period and may record the number of restarting according to a change condition of the process information. Taking an example to illustrate, a plurality of processes and PIDs thereof may be acquired according to the process information every time when the process information is read. It may be determined that the process restarts if the PID of a process is different from that in the process information read last time, then the number of restarting of the process may be added 1. Therefore, the number of restarting of each process may be acquired after the process information is read continuously by the preset frequency in the preset period. The preset period and the preset frequency may be set as default.

The second determining module 50 is configured to determine that an application corresponding to the restarting process is abnormal, if the number of restarting is greater than a preset threshold.

The device for detecting an abnormal application according to embodiments of the present disclosure, by detecting the system event of the mobile terminal, reading the process information if the triggering system event is detected, recording the number of restarting of the restarting process in the preset period if the restarting process exists, and determining that the application corresponding to the process of which the number of restarting is greater than the preset threshold is abnormal, may read the process information only if the triggering system event is detected, and may be less influenced by environment, attribute and a load of the mobile terminal, thereby reducing energy consumption and resource occupancy while improving efficiency of the abnormal application detection. Furthermore, the device may support a native process, thereby having a wider application scope for detection.

Figure 5:
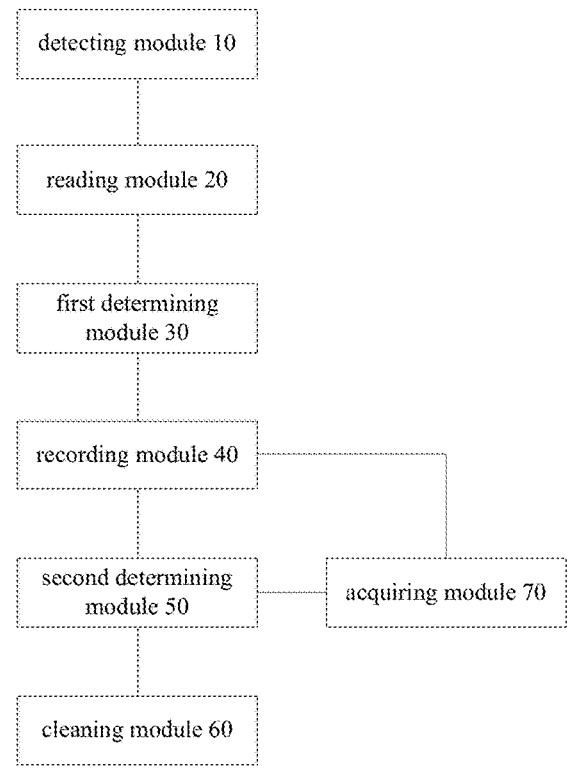
FIG. 5 is a schematic diagram showing a device for detecting an abnormal application according to another embodiment of the present disclosure.

FIG. 5 is a schematic diagram showing a device for detecting an abnormal application according to another embodiment of the present disclosure. As shown in FIG. 5, the device includes: a detecting module 10, a reading module 20, a first determining module 30, a recording module 40, a second determining module 50, a cleaning module 60 and an acquiring module 70.

Specifically, the cleaning module 60 is configured to clean the abnormal application after it is determined that the application corresponding to the restarting process is abnormal.

In embodiments of the present disclosure, a manner for cleaning the abnormal application via the cleaning module 60 may include forcedly stopping running, disabling automatic restart, removing, upgrading and the like.

In an embodiment of the present disclosure, the cleaning module 60 is specifically configured to provide the abnormal application to a user of the mobile terminal and to clean the abnormal application according to an instruction of the user. More specifically, the cleaning module 60 may provide a button for cleaning the abnormal application to the user, such that the user may touch the button to input the instruction for preforming a clean.

The acquiring module 70 is configured to acquire the number of restarting of the abnormal application and to provide the number of restarting of the abnormal application to the user of the mobile terminal, after it is determined that the application corresponding to the restarting process is abnormal. The number of restarting of the application is the number of restarting of the process corresponding to the application.

Taking an example to illustrate, FIG. 3 is a schematic diagram showing a detection result interface of an abnormal application according to an embodiment of the present disclosure. As shown in FIG. 3, two applications (360 Cleaning Master and 360 Guardian) are detected to be abnormal and the numbers of restarting thereof are shown. Furthermore, for each application, a button with "stop" is provided. The corresponding application may be stopped to finish the behavior that the abnormal application restarts frequently, if the user touches the button.

The device for detecting an abnormal application according to embodiments of the present disclosure, may clean the abnormal application after the abnormal application is determined, in addition, may provide the number of restarting of the abnormal application to the user, and may facilitate the user to understand a running condition of the abnormal application, so as to help the user to adopt an appropriate solution, thereby reducing energy consumption and resource occupancy while improving efficiency of the abnormal application detection, and improving the user experience.

In order to achieve the above embodiments, embodiments of the present disclosure provide a mobile terminal.

The mobile terminal according to embodiments of the present disclosure includes a housing, a processor, a memory, a circuit board and a power circuit. The circuit board is arranged inside a space enclosed by the housing; the processor and the memory are disposed on the circuit board; the power circuit is configured to provide power for individual circuit or component; the memory is configured to store an executable program code; and the processor, by reading the executable program code stored in the memory, is configured to run a program corresponding to the executable program code, so as to perform the followings.

At S101', a system event of the mobile phone may be detected.

In embodiments of the present disclosure, any system event in the mobile terminal may be detected, and it is further determined whether the system event detected is a triggering system event.

In an embodiment of the present disclosure, the triggering system event may be determined if the system event is one of: a broadcasting system event (e.g. a screen on broadcast, a screen off broadcast and other broadcast events), a memory shortage alarming system event, an application restarting system event, an application abnormally exiting system event and the like.

At S102', process information may be further read if the system event is the triggering system event, and it is determined whether a restarting process exists according to the process information.

In an embodiment of the present disclosure, process information recorded by the kernel/proc file system in the mobile terminal is read so as to read the process information. The kernel/proc file system is a special file system created by software, by which the kernel may export information to external. All information about the processes running currently may be recorded in the kernel/proc file system. Therefore, the process information may be read by reading the process information recorded by the kernel/proc file system in the mobile terminal.

Additionally, compared with the conventional method of reading a process via an API getRunningAppProcesses( ), the method of directly reading the process information from the kernel/proc file system may save time of reading the process information and acquire complete and comprehensive data of the process without function calculations in the API getRunningAppProcesses( ). In an implementation process of the present disclosure, an inventor found that the time period of directly reading the process information from the kernel/proc file system is about 40 percent of the time period of reading the process information via the API getRunningAppProcesses( ). Therefore, the method according to embodiments of the present disclosure may significantly save the time of reading the process information, thereby improving efficiency of detecting the abnormal application.

Specifically, in an embodiment of the present disclosure, the process information may include a process name and a process identifier (PID) corresponding to the process name. It may be determined whether a PID corresponding to a same process name is as same as a PID in the process information read last time according to the process information recorded by the kernel/proc file system in the mobile terminal or not; if not, the restarting process may be determined.

At S103', the number of restarting of the restarting process in a preset period may be recorded.

In an embodiment of the present disclosure, the process information may be read by a preset frequency in the preset period, and then the number of restarting may be recorded according to a change condition of the process information. Taking an example to illustrate, a plurality of processes and PIDs thereof may be acquired according to the process information every time when the process information is read. It may be determined that the process restarts if the PID of a process is different from that in the process information read last time, then the number of restarting of the process may be added 1. Therefore, the number of restarting of each process may be acquired after the process information is read continuously by the preset frequency in the preset period. The preset period and the preset frequency may be set as default.

At S104', it is determined that an application corresponding to the restarting process is abnormal if the number of restarting is greater than a preset threshold.

The mobile terminal according to embodiments of the present disclosure, by detecting the system event of the mobile terminal, reading the process information if the triggering system event is detected, recording the number of restarting of the restarting process in the preset period if the restarting process exists, and determining that the application corresponding to the process of which the number of restarting is greater than the preset threshold is abnormal, may read the process information only if the triggering system event is detected, and may be less influenced by environment, attribute and a load of the mobile terminal, thereby reducing energy consumption and resource occupancy while improving efficiency of the abnormal application detection. Furthermore, the mobile terminal may support a native process, thereby having a wider application scope for detection.

In an embodiment of the present disclosure, after determining that an application corresponding to the restarting process is abnormal, the processor is further configured to:
clean the abnormal application.

In embodiments of the present disclosure, a manner for cleaning the abnormal application may include forcedly stopping running, disabling automatic restart, removing, upgrading and the like.

In an embodiment of the present disclosure, the abnormal application may be provided to a user of the mobile terminal, and may be cleaned according to an instruction of the user. Specifically, a button for cleaning the abnormal application may be provided to the user such that the user may touch the button to input the instruction for preforming a clean.

In another embodiment of the present disclosure, after determining that the application corresponding to the restarting process is abnormal, the processor is further configured to: acquire the number of restarting of the abnormal application, and provide the number of restarting of the abnormal application to the user of the mobile terminal. The number of restarting of the application is the number of restarting of the process corresponding to the application.

Taking an example to illustrate, FIG. 3 is a schematic diagram showing a detection result interface of an abnormal application according to an embodiment of the present disclosure. As shown in FIG. 3, two applications (360 Cleaning Master and 360 Guardian) are detected to be abnormal and the numbers of restarting thereof are shown.

Furthermore, for each application, a button with "stop" is provided. The corresponding application may be stopped to finish the behavior that the abnormal application restarts frequently, if the user touches the button.

Therefore, the mobile terminal may facilitate the user to understand a running condition of the abnormal application, so as to help the user to adopt an appropriate solution, thereby reducing energy consumption and resource occupancy while improving efficiency of the abnormal application detection, and improving the user experience.

In order to achieve the above embodiments, embodiments of the present disclosure provide a storage medium. The storage medium is configured to store an application for performing the method for detecting an abnormal application mentioned in any one of the embodiments of the disclosure.

It is to be understood that each part of the present disclosure may be realized by the hardware, software, firmware or combination thereof. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In the description of the specification, the descriptions of terms such as "an embodiment," "some embodiments," "an example," "a specific example," or "some examples," are intended to mean that a particular feature, structure, material, or characteristic described in connection with the embodiment or example is included in at least one embodiment or example of the present disclosure. In the specification, the appearances of the above terms are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, replacements and modifications can be made in the embodiments without departing from principles and purposes of the present disclosure, the scope of the present disclosure may be limited by claims and equivalents thereof.

What is claimed is:

1. A method for detecting an abnormal application, comprising: detecting a system event of a mobile terminal; reading process information based upon the system event Mg being a triggering system event, and determining whether a restarting process exists according to the process information; recording a number of restarting of the restarting process in a preset period; and determining that an application corresponding to the restarting process is abnormal, if the number of restarting is greater than a preset threshold; and wherein the system event is the triggering system event, if the system event is being one of: a broadcasting system event, a memory shortage alarming system event, an application abnormally restarting system event and an application abnormally exiting system event.

2. The method according to claim 1, after determining that an application corresponding to the restarting process is abnormal, further comprising:

cleaning the abnormal application.

3. The method according to claim 1, wherein process information recorded by a kernel/proc file system in the mobile terminal is read to read the process information.

4. The method according to claim 3, wherein the process information comprises a process name and a process identifier corresponding to the process name, and determining whether a restarting process exists according to the process information comprises: determining whether a process identifier corresponding to a same process name is as same as a process identifier corresponding to the same process name at a last time; and determining that the restarting process exists, if not.

5. The method according to claim 2, wherein cleaning the abnormal application comprises:

providing the abnormal application to a user of the mobile terminal; and cleaning the abnormal application according to an instruction of the user.

6. The method according to claim 1, after determining that an application corresponding to the restarting process is abnormal, further comprising:

acquiring the number of restarting of the abnormal application, and providing the number of restarting of the abnormal application to the user of the mobile terminal.

7. The method according to claim 1, wherein recording the number of restarting of the restarting process in a preset period comprises: reading the process information by a preset frequency in the preset period and recording the number of the restarting process according to a change condition of the process information.

8. A terminal, comprising a housing, a processor, a memory, a circuit board and a power circuit, wherein the circuit board is arranged inside a space enclosed by the housing; the processor and the memory are disposed on the circuit board; the power circuit is configured to provide power for individual circuit or component; the memory is configured to store an executable program code; and the processor is configured to run a program corresponding to the executable program code, by reading the executable program code stored in the memory, so as to perform the followings: detecting a system event of a mobile terminal; reading process information based upon, the system event being a triggering system event, and determining whether a restarting process exists according to the process information; recording a number of restarting of the restarting process in a preset period; and determining that an application corresponding to the restarting process is abnormal, if the number of restarting is greater than a preset threshold; and wherein the system event is the triggering system event, if the system event is one of: a broadcasting system event, a memory shortage alarming system event, an application abnormally restarting system event and an application abnormally exiting system event.

9. The terminal according to claim 8, wherein after determining that an application corresponding to the restarting process is abnormal, the processor is configured to perform the followings:

cleaning the abnormal application.

10. The terminal according to claim 8, wherein process information recorded by a kernel/proc file system in the mobile terminal is read to read the process information.

11. The terminal according to claim 10, wherein the process information comprises a process name and a process identifier corresponding to the process name, and determining whether a restarting process exists according to the process information comprises: determining whether a process identifier corresponding to a same process name is as same as a process identifier corresponding to the same process name at a last time; and determining that the restarting process exists, if not.

12. The terminal according to claim 9, wherein cleaning the abnormal application comprises:

providing the abnormal application to a user of the mobile terminal; and cleaning the abnormal application according to an instruction of the user.

13. The terminal according to claim 8, wherein after determining that an application corresponding to the restarting process is abnormal, the processor is configured to perform the followings:

acquiring the number of restarting of the abnormal application, and providing the number of restarting of the abnormal application to the user of the mobile terminal.

14. The terminal according to claim 8, wherein recording the number of restarting of the restarting process in a preset period comprises:

reading the process information by a preset frequency in the preset period and recording the number of restarting according to a change condition of the process information.

15. A non-transitory computer storage medium, configured to store an application for performing a method for detecting an abnormal application, wherein the method comprises; detecting a system event of a mobile terminal; reading process information based upon the system event being a triggering system event; determining whether a restarting process exists according to the process information; recording a number of restarting of the restarting process in a preset period; and determining that an application corresponding to the restarting process is abnormal, if the number of restarting is greater than a preset threshold; and wherein the system event is the triggering system event, if the system event is one of: a broadcasting system event, a memory shortage alarming system event, an application abnormally restarting system event and an application abnormally exiting system.

16. The non-transitory computer storage medium according to claim 15, wherein after determining that an application corresponding to the restarting process is abnormal, the method further comprises:

cleaning the abnormal application.

17. The non-transitory computer storage medium according to claim 15, wherein process information recorded by a kernel/proc file system in the mobile terminal is read to read the process information.

\* \* \* \* \*